US008691127B2

(12) United States Patent
Jakobi et al.

(10) Patent No.: US 8,691,127 B2
(45) Date of Patent: Apr. 8, 2014

(54) METHOD FOR PRODUCING A COMPOSITE COMPONENT BY MULTI-COMPONENT INJECTION MOLDING

(75) Inventors: Reinhard Jakobi, Maxdorf (DE);
Jürgen Bartl, Ludwigshafen (DE);
Kamil Fischer-Jerdonek, Frankenthal (DE); Cecile Gibon, Mannheim (DE);
Harald Kröger, Böhl-lggelheim (DE);
Susanne Zeiher, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 218 days.

(21) Appl. No.: 13/141,012

(22) PCT Filed: Dec. 7, 2009

(86) PCT No.: PCT/EP2009/066520
§ 371 (c)(1),
(2), (4) Date: Jun. 20, 2011

(87) PCT Pub. No.: WO2010/069804
PCT Pub. Date: Jun. 24, 2010

(65) Prior Publication Data
US 2011/0318524 A1 Dec. 29, 2011

(30) Foreign Application Priority Data

Dec. 19, 2008 (EP) .................................... 08172372

(51) Int. Cl.
*B29C 44/06* (2006.01)
*B32B 27/34* (2006.01)
(52) U.S. Cl.
USPC ......... 264/46.4; 264/45.2; 264/54; 428/474.4
(58) Field of Classification Search
USPC ........................ 264/45.2, 46.4, 54; 428/474.4
See application file for complete search history.

(56) References Cited

U.S. PATENT DOCUMENTS

| 3,651,014 | A | 3/1972 | Witsiepe |
| 3,728,292 | A | 4/1973 | McGrath et al. |
| 4,789,727 | A | 12/1988 | Sun |
| 5,496,887 | A | 3/1996 | Braune |
| 5,702,810 | A * | 12/1997 | Koseki et al. ............... 428/318.8 |
| 5,817,721 | A | 10/1998 | Warzelhan et al. |
| 5,863,991 | A | 1/1999 | Warzelhan et al. |
| 5,880,220 | A | 3/1999 | Warzelhan et al. |
| 5,883,199 | A | 3/1999 | McCarthy et al. |
| 5,889,135 | A | 3/1999 | Warzelhan et al. |
| 5,936,045 | A | 8/1999 | Warzelhan et al. |
| 6,018,004 | A | 1/2000 | Warzelhan et al. |
| 6,046,248 | A | 4/2000 | Warzelhan et al. |
| 6,103,858 | A | 8/2000 | Yamamoto et al. |
| 6,111,058 | A | 8/2000 | Warzelhan et al. |
| 6,114,042 | A | 9/2000 | Warzelhan et al. |
| 6,120,895 | A | 9/2000 | Kowitz et al. |
| 6,201,034 | B1 | 3/2001 | Warzelhan et al. |
| 6,258,924 | B1 | 7/2001 | Warzelhan et al. |
| 6,297,077 | B1 | 10/2001 | Fischer |
| 6,303,677 | B1 | 10/2001 | Warzelhan et al. |
| 6,353,084 | B1 | 3/2002 | Warzelhan et al. |
| 6,421,979 | B1 | 7/2002 | Fischer et al. |
| 6,941,719 | B2 * | 9/2005 | Busseuil et al. ............... 52/846 |
| 7,199,165 | B2 * | 4/2007 | Kassa et al. .................. 521/135 |
| 7,304,172 | B2 | 12/2007 | Coates et al. |
| 2005/0276970 | A1 | 12/2005 | Busseuil et al. |
| 2006/0097536 | A1 * | 5/2006 | DePue et al. .................. 296/37.8 |
| 2007/0020996 | A1 | 1/2007 | Kurzeja |
| 2008/0167419 | A1 | 7/2008 | Eipper et al. |
| 2008/0281018 | A1 | 11/2008 | Seeliger et al. |
| 2010/0009213 | A1 | 1/2010 | Eipper et al. |
| 2011/0034662 | A1 | 2/2011 | Witt et al. |
| 2011/0039999 | A1 | 2/2011 | Witt et al. |

(Continued)

FOREIGN PATENT DOCUMENTS

| AU | 6755801 A | 1/2002 |
| DE | 4304751 A1 | 8/1994 |

(Continued)

OTHER PUBLICATIONS

Al-Sheyyab, A et al. "Insert coating as a pre-processing approach for improvement of adhesive bonding in plastic-metal hybrid structures." in: ANTEC 2007: Conference Proceedings [online]. (Society of Plastics Engineers, 2007), pp. 1000-1004. [retrieved on May 15, 2005]. Retrieved from Knovel using Internet, <URL: http://www.knovel.com>.*

(Continued)

*Primary Examiner* — Christina Johnson
*Assistant Examiner* — David Schmerfeld
(74) *Attorney, Agent, or Firm* — Novak Druce Connolly Bove + Quigg LLP

(57) ABSTRACT

The invention relates to processes for the production of a composite component via multicomponent injection molding, where the composite component comprises a main body composed of a thermoplastic and an external layer composed of a foamed thermoplastic. The main body is produced via injection molding and subsequent hardening of the thermoplastic. A mixture of the foamed thermoplastic and a chemical blowing agent is injected onto the main body, subsequently hardened in the same injection mold, and foamed by heating. The composite component is solidified via cooling. The foamed thermoplastic is at least one polyamide whose modulus of elasticity is from 1 MPa to 250 MPa in the entire temperature range from 70° C. to 180° C. The chemical blowing agent is in non-polymerized form.

5 Claims, No Drawings

(56) References Cited

U.S. PATENT DOCUMENTS

| | | |
|---|---|---|
| 2011/0098372 A1 | 4/2011 | Aulenta et al. |
| 2011/0178196 A1 | 7/2011 | Steinke et al. |
| 2011/0187029 A1 | 8/2011 | Dietrich et al. |
| 2011/0237743 A1 | 9/2011 | Ren et al. |
| 2011/0237744 A1 | 9/2011 | Ren et al. |
| 2011/0313075 A1 | 12/2011 | Siegenthaler et al. |
| 2011/0318524 A1 | 12/2011 | Jakobi et al. |
| 2012/0128919 A1 | 5/2012 | Benten et al. |
| 2012/0201967 A1 | 8/2012 | Skupin et al. |

FOREIGN PATENT DOCUMENTS

| | | |
|---|---|---|
| DE | 4401055 A1 | 7/1995 |
| DE | 4440858 A1 | 5/1996 |
| DE | 19638686 A1 | 3/1998 |
| DE | 100 53 115 C1 | 4/2002 |
| DE | 102005033912 B3 | 10/2006 |
| DE | 102005053068 A1 | 5/2007 |
| DE | 60214699 T2 | 9/2007 |
| EP | 0245975 A1 | 11/1987 |
| EP | 0 249 975 A1 | 12/1987 |
| EP | 488617 A2 | 6/1992 |
| EP | 0539541 A1 | 5/1993 |
| EP | 0565235 A2 | 10/1993 |
| EP | 0575349 A1 | 12/1993 |
| EP | 0647668 A1 | 4/1995 |
| EP | 652910 A1 | 5/1995 |
| EP | 0792 309 A1 | 9/1997 |
| EP | 0897785 A1 | 2/1999 |
| EP | 1084816 A2 | 3/2001 |
| EP | 1227129 A1 | 7/2002 |
| EP | 1264860 A1 | 12/2002 |
| EP | 1496587 A1 | 1/2005 |
| EP | 1607204 A2 | 12/2005 |
| EP | 2305447 A1 | 4/2011 |
| JP | 2004230633 A | 8/2004 |
| JP | 2004300284 A | 10/2004 |
| JP | 2005146482 A | 6/2005 |
| JP | 2007161837 A | 6/2007 |
| WO | WO-92/09654 A2 | 6/1992 |
| WO | WO-9214782 A1 | 9/1992 |
| WO | WO-92/19680 A1 | 11/1992 |
| WO | WO-94/03543 A1 | 2/1994 |
| WO | WO-9615173 A1 | 5/1996 |
| WO | WO-9615174 A1 | 5/1996 |
| WO | WO-9615175 A1 | 5/1996 |
| WO | WO-9615176 A1 | 5/1996 |
| WO | WO-96/21689 A2 | 7/1996 |
| WO | WO-9621690 A1 | 7/1996 |
| WO | WO-9621691 A1 | 7/1996 |
| WO | WO-9621692 A1 | 7/1996 |
| WO | WO-96/25446 A1 | 8/1996 |
| WO | WO-96/25448 A1 | 8/1996 |
| WO | WO-9812242 A1 | 3/1998 |
| WO | WO-0061664 A1 | 10/2000 |
| WO | WO-0200745 A1 | 1/2002 |
| WO | WO-2006074815 A1 | 7/2006 |
| WO | WO-2006/097353 A1 | 9/2006 |
| WO | WO-2006/097354 A1 | 9/2006 |
| WO | WO-2006/097355 A1 | 9/2006 |
| WO | WO-2006/097356 A1 | 9/2006 |
| WO | WO-2007/009930 A1 | 1/2007 |
| WO | WO-2007/125039 A1 | 11/2007 |
| WO | WO-2008/020012 A2 | 2/2008 |
| WO | WO-2008/095871 A1 | 8/2008 |
| WO | WO-2008/099009 A1 | 8/2008 |
| WO | WO-2008/138892 A1 | 11/2008 |
| WO | WO-2009/024294 A1 | 2/2009 |
| WO | WO-2009/112387 A1 | 9/2009 |
| WO | WO-2009/127555 A1 | 10/2009 |
| WO | WO-2009127556 A1 | 10/2009 |
| WO | WO-2010/000572 A1 | 1/2010 |
| WO | WO-2010026160 A1 | 3/2010 |
| WO | WO-2010/034712 A1 | 4/2010 |
| WO | WO-2010034689 A1 | 4/2010 |
| WO | WO-2010/069804 A1 | 6/2010 |
| WO | WO-2010069813 A1 | 6/2010 |
| WO | WO-2011/054786 A1 | 5/2011 |

OTHER PUBLICATIONS

Ultramid 1C [online]. Kumra Trading Co., Ltd., 2004 [retrieved on Oct. 18, 2013]. Retrieved from the Internet: <URL: http://kumra.co.kr/3_produ03.html>.*

International Search Report for PCT/EP2010/060068 mailed Oct. 29, 2010.

International Preliminary Report on Patentability for PCT/EP2010/060068 mailed Nov. 14, 2011.

International Search Report for PCT/EP2010/067521 mailed May 11, 2011.

Anonymous, "Ultramid 1C the soluble polyamide," Jul. 2007, pp. 1-4, Internet: URL:http://www.plasticsportal.net/wa/plasticsEU{en_GB/function/conversions:/publish/common/upload/engineering_[;astocsl;tra,od_1C.pdf>[gefunden am Feb. 18, 2010] die Seiten 2 and 3 überbrückende Tabelle, XP002570183.

Kempf, J., et al., "Karosserie-Leichtbau: Einsatz von Strukturschäumen in Hohl-profilen" [Lightweight bodywork structures: use of structural foams in hollow profiles], in VDI Gesellschaft Kunststofftechnik, Kunststoffe im Automobilbau, VDI Verlag GmbH, Dusseldorf, 2006, pp. 193-205.

Phang, I.Y., et al., "Morphology, thermal and mechanical properties of nylon 12/organoclay nanocomposites prepared by melt compounding," Polym Inst, (2005), vol. 54, pp. 456-464.

Rohde-Liebenau, H.U.W., Nylon 12, Polymer Data Handbook (1999), pp. 225-229, Oxford University Press, XP002570182.

* cited by examiner

METHOD FOR PRODUCING A COMPOSITE COMPONENT BY MULTI-COMPONENT INJECTION MOLDING

CROSS-REFERENCE TO RELATED APPLICATIONS

This application is a national stage application (under 35 U.S.C. §371) of PCT/EP2009/066520, filed Dec. 7, 2009, which claims benefit of European application 08172372.8, filed Dec. 19, 2008.

BACKGROUND OF THE INVENTION

The invention relates to processes for the production of a composite component via multicomponent injection molding, where the composite component comprises a main body composed of a thermoplastic A) and an external layer composed of a foamed thermoplastic B), where the main body is produced in a first process step a) via injection molding of the thermoplastic A) and subsequent hardening of the same in an injection mold, and an external layer is injected on to the main body in a second process step b) which follows directly, via injection molding of a mixture comprising the thermoplastic B) and comprising a chemical blowing agent, and the mixture is subsequently hardened in the same injection mold, with somewhat extended cavity, and the external layer injected on to the main body is foamed in a further process step d) via introduction of heat, and the composite component is solidified via cooling in a final process step e).

The invention further relates to composite components and to reinforced load-bearing elements, where these can be produced by said processes, and also to mixtures, and to the use of said mixtures for the production of composite components.

The design of load-bearing elements, for example the design of bodywork parts for motor-vehicle construction, generally aims to maximize stability, stiffness, and/or load-bearing capability, while at the same time minimizing weight. The load-bearing elements used are therefore often of hollow-profile design, or are hollow, or are at least to some extent of shell-type design. To provide a further increase in the stability of these load-bearing elements, they are often additionally reinforced with reinforcement elements composed of plastic. The literature describes various composite components composed of plastic as suitable reinforcement elements for load-bearing elements.

By way of example, DE 602 14 699 T2 describes structural reinforcement elements which are suitable for the reinforcement of a hollow structural element, and which comprise a reinforcement element which has, on a section of its surface, an expandable adhesive material. Foamable epoxy-based resins are mentioned as preferred expandable adhesive material. A number of processes are mentioned for the production of said reinforcement elements, inter alia two-component injection molding.

J. Kempf and M. Derks, "Karosserie-Leichtbau: Einsatz von Strukturschäumen in Hohlprofilen" [Lightweight bodywork structures: use of structural foams in hollow profiles], in VDI Gesellschaft Kunststofftechnik, Kunststoffe im Automobilbau, VDI Verlag GmbH, Dusseldorf, 2006, pp. 193-205, disclose structural foam parts in which, by way of example, load-bearing items composed of polyamide are produced by two-component injection molding with uncrosslinked structural foam based on epoxy resins. These structural foam parts are then introduced, during the bodywork-construction process, into hollow profiles, and the expansion and solidification of the epoxy foams preferably takes place via exposure to heat in the painting process. A modulus of elasticity greater than 500 MPa at 80° C. is mentioned as one of the requirements placed on the structural foam.

European patent application 08159517.5 (application number), which was not published prior to the priority date of this application, teaches foamable mixtures composed of thermoplastic polyamides and of a copolymer acting as chemical blowing agent. Said mixtures may by way of example be applied by the multicomponent injection molding process to a core material composed of glassfiber-reinforced polyamide, thus producing foamable reinforcement parts. These reinforcement parts can be introduced into hollow profiles and foamed.

These processes described in the prior art for the production of composite components via multicomponent injection molding are not entirely satisfactory in respect of certain properties, and the same applies to the composite components that can be produced by said processes with a foamable or foamed external layer, and more particularly to the composite components described as advantageous and based on foamable epoxy resins. By way of example, when two-component injection molding processes use epoxy resins the high melt viscosity means that either relatively long cycle times have to be accepted or high injection pressures have to be used, both of which lead to increased costs. A further factor is that, when using epoxy resins, it is impossible to achieve the desired extent of computer-aided rheological modeling or optimization of the injection molding process, in order to minimize the need for costly practical trials. The adhesion of the external layer of expandable or expanded epoxy resin to the main body is moreover often inadequate, and the usefulness of the composite component as reinforcement element is therefore restricted. The storage stability and/or resistance to moisture of these known composite components is moreover often also not entirely satisfactory, both in the expandable state and in the expanded state. Recycling of these known composite components at the end of their useful life is desirable but often possible only at considerable cost.

BRIEF SUMMARY OF THE INVENTION

It was therefore an object of the present invention to provide processes which can produce composite components via multicomponent injection molding and which are less costly by virtue of reduced cycle times and/or reduced injection molding pressures and/or better capability for computer-aided modeling, and which can produce composite components improved over known composite components with respect to the following combined properties:
- adhesion of the expandable or expanded external layer on the main body,
- storage stability and/or resistance to moisture, both in the expandable state and in the expanded state, and also
- recyclability.

The processes mentioned in the introduction for the production of composite components via multicomponent injection molding have accordingly been found, where an essential feature of the invention is that it comprises using, as thermoplastic B) in the mixture used in process step b), at least one polyamide whose modulus of elasticity derived from the tensile test (tensile modulus) $E_t$ is from 1 MPa to 250 MPa (determined to DIN EN ISO 527 of April 1996) in the entire temperature range from 70° C. to 180° C., and using, as chemical blowing agent in the mixture used in process step b), one or more substances present in non-polymerized form. The invention further relates to composite components and to reinforced load-bearing elements, where these can be produced by the processes of the invention, and also to mixtures, and to the use of said mixtures for the production of said composite components.

By virtue of reduced cycle times and/or reduced injection molding pressures and/or better capability for computer-aided modeling, the processes of the invention are less costly than known processes for the production of composite components via multicomponent injection molding; when the composite components that can be produced by said processes of the invention are compared with known composite components, more particularly those having an external layer based on foamable epoxy resins, they have advantages in terms of the combination of adhesion of the expandable or expanded external layer on the main body, storage stability and/or resistance to moisture, both in the expandable state and in the expanded state, and also in terms of their recyclability.

The processes of the invention, and also the other subject matter and uses of the invention, are described below.

DETAILED DESCRIPTION OF THE INVENTION

Processes for the production of composite components via multicomponent injection molding, more particularly via two-component injection molding, are known per se to the person skilled in the art and are described in the literature, for example in Sächtling Kunststoff-Taschenbuch [Plastics Handbook], 29th edition, 2004, Carl Hanser Verlag, Munich, Vienna, p. 222.

The usual method of multicomponent injection molding, for example two-component injection molding, is that a thermoplastic A) is melted in an injection molding machine in a first process step a), and injected into an injection mold until this is completely filled. The temperature of the melt of the thermoplastic A) in the injection molding machine (injection molding temperature) depends in essence on the nature of the plastic A), and is within ranges known to the person skilled in the art, an example for polyamide being the range from 220° C. to 350° C., preferably from 250° C. to 320° C., particularly preferably from 260° C. to 300° C. The mold temperatures (temperatures in the injection mold) here are in the range from 20° C. to 120° C., preferably in the range from 40° C. to 100° C. Said plastic A) hardens via cooling, to form a main body. Unfilled spaces are formed within the injection mold either via the cooling process and the attendant volume shrinkage of the plastic A) or preferably via extension of the cavity of the injection mold, for example via partial opening of the injection mold after solidification of the plastic A). In another preferred embodiment, the cavity of the injection mold is extended via the withdrawal of a slide, or via the transposition of the main body within the injection mold into another, larger cavity (using what is known as a turntable mold).

In a second process step b), a mixture comprising a thermoplastic B) which differs from the thermoplastic A), and comprising a chemical blowing agent, is then melted in the same or another injection molding machine, and is injected into the unfilled spaces formed in process step a), in the same injection mold. Cooling hardens the thermoplastic B), forming an external layer which entirely or to some extent covers the main body, preference being given to a sheath entirely covering the main body. Further layers of thermoplastics can be injected analogously on to the material. The temperature of the melt of the mixture comprising the thermoplastic B) and comprising a chemical blowing agent, within the injection molding machine (injection molding temperature), is usually selected to be higher than in process step a), in order to permit superficial melting of the main body. Because the thermal conductivity of the plastic is low, the main body remains substantially in the solidified state here. However, for the purposes of the present invention, by virtue of the good adhesion properties of the thermoplastic B), this can also be processed in a mixture with the chemical blowing agent at temperatures lower than those for the thermoplastic A), thus very substantially avoiding any foaming of the thermoplastic B) via decomposition of the chemical blowing agent. Advantageous factors for preventing premature foaming of the thermoplastic B) in process step b) are a low residence time in the plastifying unit of the injection molding machine and minimum injection molding temperature and mold temperature. The injection molding temperature is usually in the range from 180° C. to 260° C., preferably from 180° C. to 230° C., particularly preferably from 180° C. to 200° C. To conclude process step b), the resultant composite components composed of main body and of external layer which has in essence not yet been foamed are ejected from the injection mold after cooling with simultaneous solidification.

These composite components can be further processed immediately in the following process steps, but they can also be stored for a number of weeks and months before further processing by the following process steps.

After said second process step b) and prior to the further process step d) which will be described below, the main body external layer injected on to the same can be introduced, in an optional process step c), using methods known to the person skilled in the art, into a load-bearing element which has at least one cavity, or which is at least to some extent of shell-type design or of hollow-profile design, and can be fixed therein. Said process step c) is to be carried out more particularly when the composite component obtained after the final process step e) is intended to act as reinforcement element having a cohesive and/or interlocking connection to the load-bearing element. If process step c) is not carried out, the composite components obtained after the final process step e) are composed of a main body and of a foamed external layer and can be used only in additional operations at a later time as reinforcement elements for load-bearing elements, but nevertheless can be used in other functions, for example as sound-deadening elements or thermal insulation elements.

In a further process step d), the external layer injected on to the main body is foamed via introduction of heat, using methods known to the person skilled in the art. The temperature (foaming temperature) to be set during said foaming process depends on the nature of the chemical blowing agent, and is above the softening point of the thermoplastic B), usually in the range from 120° C. to 220° C., preferably from 150° C. to 200° C., particularly preferably from 180° C. to 200° C.

In one preferred embodiment, including process step c), the composite components can be further processed, using methods known to the person skilled in the art and described in the literature (for example in DE 602 14 699 T2 and J. Kempf and M. Derks, "Karosserie-Leichtbau: Einsatz von Strukturschäumen in Hohlprofilen" [Lightweight bodywork structures: use of structural foams in hollow profiles], in VDI Gesellschaft Kunststofftechnik, Kunststoffe im Automobilbau, VDI Verlag GmbH, Dusseldorf, 2006, pp. 193-205) via foaming of the external layer to give reinforcement elements for load-bearing elements which are hollow or which are at least to some extent of shell-type design or of hollow-profile design. The external layer which expands via introduction of heat on the composite components fills, entirely or to some extent, the regions designed to be hollow or to be of shell type or to be a hollow profile, within the load-bearing element. By virtue of the particular properties of the thermoplastic B), adhesive bonding occurs here between the composite component and the load-bearing element.

If the load-bearing element is a bodywork part of a motor vehicle, process step d) can be carried out in an energy-efficient and particularly advantageous manner during the bodywork-painting process. The temperatures prevailing during the drying of the paint, which is usually applied by a cathodic electrodeposition process, are from 160° C. to 220° C., preferably from 180° C. to 210° C., particularly preferably from 185° C. to 205° C., and these simultaneously bring about the foaming of the external layer injected on to the material.

The cohesive connection and/or interlocking connection brought about by the foaming process and after process step e) also permits, for example, the production of the reinforced load-bearing elements described in EP 1 084 816 A2 (where the reinforced load-bearing elements are described as "composite component (3)").

In the final process step e), the foamed external layer is solidified, and this can, as a function of the expandable plastic B) used, be achieved, for example, via a crosslinking reaction with heat, or via cooling below the solidification temperature.

Process step e) gives—if process step c) is not carried out—composite components comprising a main body composed of a thermoplastic A) and comprising an external layer composed of a foamed thermoplastic B).

It is preferable that—with inclusion of process step c)—reinforced load-bearing elements are obtained, comprising a load-bearing element and a composite component acting as reinforcement element having cohesive and/or interlocking connection to the load-bearing element, where the composite component comprises a main body composed of a thermoplastic A) and comprises an external layer composed of a foamed thermoplastic B). The main body of the composite component makes a decisive contribution to the structural/mechanical reinforcement of the load-bearing element, and the foamed external layer of the composite component has a decisive function in the provision of the cohesive and/or interlocking connection to the load-bearing element.

Thermoplastics A) that can be used are in principle any of the thermoplastically processable plastics known to the person skilled in the art and described in the literature, examples being polyolefins, polyamides, polyurethanes, polyesters, polyether sulfones, polyacrylates, polyacetates, and also plastics composed of monomers comprising vinyl groups, or plastics based on styrene as monomer.

Examples of polyolefins that can generally be used are polyethylene, polypropylene, poly-1-butene, polytetrafluoroethylene. Examples of suitable polyamides are nylon-6, nylon-11, nylon-6,6, nylon-6,10, or nylon-6,12. Examples of suitable polyesters are polyethylene terephthalate, polybutylene terephthalate, or polycarbonate. Examples of polyacrylates that can usually be used are poly(meth)acrylates, polymethacrylate, or polyacrylonitrile. An example of a polyacetal that can be used is polyoxymethylene. Examples of suitable polymers which comprise monomer units having vinyl groups are polyvinyl chloride, polyvinylidene chloride, polyvinylcarbazole, polyvinyl acetate, and polyvinyl alcohol. Examples of suitable styrene-based plastics are polystyrene, impact-modified polystyrene, acrylonitrile-butadiene-styrene copolymers, styrene-acrylonitrile copolymers, and acrylate-styrene-acrylonitrile copolymers. Other suitable thermoplastics are polyether sulfone and polyetherimide. It is also possible to use mixtures of the abovementioned polymers or copolymers.

Preferred thermoplastics A) are polyamides.

In one particularly preferred embodiment, the thermoplastics A) are fiber-reinforced thermoplastics. Any desired fiber usually used for reinforcement and known to the person skilled in the art can be used for this reinforcement. Examples of suitable fibers are glass fibers, carbon fibers, aramid fibers, boron fibers, metal fibers, or potassium titanate fibers. The fibers can be used in the form of short fibers or of long fibers. The fibers can also be present in ordered or unordered form in the polymer material.

However, an ordered arrangement is usual particularly when long fibers are used. The fibers used here can take the form of individual fibers or rovings or fiber mats. One particularly preferred thermoplastic A) is fiber-reinforced, in particular glassfiber-reinforced, polyamide.

The thermoplastics A) can also comprise further additives. Examples of these are usual plasticizers, impact modifiers, flame retardants, and other additives which are known to the person skilled in the art and are usually added to plastics.

The thermoplastic A) and the thermoplastic B) used in the processes of the invention can be identical, but it is preferable that the thermoplastic A) used is a polymer that differs from the thermoplastic B) used, particularly in relation to chemical constitution, physical properties, and/or additives comprised. It is particularly preferable that, alongside the polyamide used as thermoplastic B), the thermoplastic A) used also comprises a—particularly glassfiber-reinforced—polyamide, which differs by way of example in monomer constitution or in modulus of elasticity from the thermoplastic B); in this embodiment of the invention, the composite components obtained according to the invention permit particularly good and easy recycling at the end of their useful life.

In the second process step b), a mixture is used, comprising the thermoplastic B) and comprising a chemical blowing agent.

Said mixture preferably comprises from 70% by weight to 99.9% by weight, more particularly from 90% by weight to 99% by weight, particularly preferably from 95% by weight to 99% by weight, of thermoplastic B), and from 30% by weight to 0.1% by weight, more particularly from 10% by weight to 1% by weight, particularly preferably from 5% by weight to 1% by weight, of chemical blowing agent, where the % by weight data are based in each case on the total weight of thermoplastic B) and of chemical blowing agent, and give a total of 100% by weight. The mixture and/or the thermoplastic B) can also comprise further additives. Examples of these are usual flame retardants and other additives which are known to the person skilled in the art and which are usually added to plastics.

The mixture can in principle be produced by any of the processes known to the person skilled in the art, and used in process step b). In principle, it is possible to introduce, respectively, the thermoplastic B) and the chemical blowing agent separately to the injection molding machine, and to delay production of the mixture until the materials are within said machine. However, it is preferable that the thermoplastic B) and the chemical blowing agent are processed to give a mixture prior to the injection molding process according to process step b), and by way of example the thermoplastic B) and the chemical blowing agent, respectively, in the form of powder or of pellets are mixed in mixing apparatuses known to the person skilled in the art, giving a heterogeneous mixture, or the chemical blowing agent is applied in a drum in the form of powder to the thermoplastic B) in the form of pellets; however, another possibility is that the thermoplastic B) and the chemical blowing agent are mixed in the melt, for example in extruders or kneaders known to the person skilled in the art, giving a comparatively homogeneous blend, prior to subsequent use of the mixture in process step b) of the processes of the invention. The chemical blowing agent can also be used in the form of what is known as a masterbatch in the processes mentioned.

Thermoplastics B) that can be used according to the invention comprise at least one polyamide whose modulus of elasticity derived from the tensile test (tensile modulus) $E_t$ is from 1 MPa to 250 MPa, preferably from 1 MPa to 150 MPa, particularly preferably from 1 MPa to 50 MPa (determined to DIN EN ISO 527 of April 1996) in the entire temperature range from 70° C. to 180° C. These polyamides generally have a very low degree of crystallinity, more particularly a degree of crystallinity of from 1% to 40%, preferably from 1% to 20% (where the degree of crystallinity is a measure of the proportion of crystalline fractions within the polyamide, and can be determined via X-ray diffraction, or indirectly via measurement of the specific latent heat of fusion $\Delta H_{crist.}$ by means of differential scanning calorimetry relative to a fully crystalline polyamide).

Polyamide copolymers can be used with preference as thermoplastics B), and more particularly those composed of, as monomer units, caprolactam, hexamethylenediamine, adipic acid, and bis(4-aminocyclohexyl)methane. Particularly preferred thermoplastics B) are obtained via copolymerization of from 15% by weight to 55% by weight of caprolactam, from 15% by weight to 55% by weight of hexamethylenediamine, from 15% by weight to 55% by weight of adipic acid, and from 15% by weight to 55% by weight of bis(4-aminocyclohexyl)methane, where each of the % by weight values is based on the total weight of the four monomers mentioned, and these values give a total of 100% by weight. The polyamides per se that can be used as thermoplastics B), and also their production, are known to the person skilled in the art and are described in the literature.

The chemical blowing agent used in the mixture with the thermoplastic B) can comprise one or more substance mixtures or substances present in non-polymerized form, where these eliminate a gas, preferably nitrogen or carbon dioxide, at elevated temperatures, more particularly at temperatures of from 130° C. to 250° C. Chemical blowing agents of this type are known to the person skilled in the art and are described in the literature. Preferred chemical blowing agents are 1,1'-azobis(formamide), sulfohydrazides, such as 4, 4'-oxibisbenzenesulfohydrazide, p-toluenesulfonylhydrazide, or p-toluenesulfonylsemicarbazide, dinitrosopentamethylenetetramine, phenyltetrazole, alkali metal carbonates, or alkali metal hydrogencarbonates, in particular sodium carbonate or sodium hydrogencarbonate, or a mixture composed of two or more of the compounds mentioned. One very particularly preferred chemical blowing agent used is a mixture composed of sodium hydrogencarbonate and citric acid; this mixture is preferably composed of from 10% by weight to 90% by weight, more particularly from 20% by weight to 80% by weight, particularly preferably from 30% by weight to 70% by weight, of sodium hydrogencarbonate, and from 90% by weight to 10% by weight, more particularly from 80% by weight to 20% by weight, particularly preferably from 70% by weight to 30% by weight, of citric acid, where each of the % by weight values is based on the total weight of sodium hydrogencarbonate and citric acid, and these values give a total of 100% by weight.

The mixture that comprises, as thermoplastic B), at least one polyamide whose modulus of elasticity derived from the tensile test (tensile modulus) $E_t$ is from 1 MPa to 250 MPa (determined to DIN EN ISO 527 of April 1996) in the entire temperature range from 70° C. to 180° C., and that comprises, as chemical blowing agent, one or more substances present in non-polymerized form, is particularly suitable for the production according to the invention of composite components and of reinforced load-bearing elements.

Load-bearing elements that can be used comprise any of the components which have at least one cavity, or which are at least to some extent of shell-type design or of hollow-profile design. Preferred load-bearing elements are hollow profiles, more particularly extruded profiles or pipes.

The load-bearing elements can in principle be composed of any of the materials which are dimensionally stable at the temperatures prevailing in process steps d) and e), high-temperature-resistant plastics being among the examples of these. The load-bearing elements are preferably composed of metallic materials, in particular steel or aluminum. Preferred load-bearing elements are metallic hollow profiles, more particularly bodywork components, for example the columns used in motor vehicle construction.

The processes of the invention can produce composite components comprising a main body composed of a thermoplastic A) and comprising an external layer composed of a foamed thermoplastic B). These composite components can more particularly be used as sound-deadening elements and/or thermal insulation elements, for example as baffle, or as sound-deadened components in the intake section of automobiles, e.g. intake manifolds, air filters.

The processes of the invention can also produce reinforced load-bearing elements comprising a load-bearing element and a composite component acting as reinforcement element, where the composite component comprises a main body composed of a thermoplastic A) and comprises an external layer composed of a foamed thermoplastic B). These reinforced load-bearing elements can more particularly be used as bodywork components, for example as columns or vehicle-underbody reinforcement or roof reinforcement, or else as brake pedals or clutch pedals. These reinforcing elements can also be used in other conveyances, for example in aircraft construction, or in rail vehicles.

By virtue of reduced cycle times and/or reduced injection molding pressures and/or better capability for computer-aided modeling, the processes of the invention for the production of composite components via multicomponent injection molding are less costly than the processes described in the prior art. When the composite components produced by said processes are compared with known composite components, they have been improved in relation to the combination of the following properties adhesion of the expandable or expanded external layer on the main body, storage stability and/or resistance to moisture, both in the expandable state and in the expanded state, and also recyclability.

Examples are used for further explanation of the invention below.

EXAMPLES

Starting Materials:
Components or examples with prefix "comp.-" are not according to the invention and serve for comparison.
Thermoplastic A):
  The components A) used were:
A-i: a commercially available polyamide, Ultramid® B3WG6CR, from BASF SE.
Thermoplastic B):
  The components B) used were:
B-i: a commercially available polyamide copolymer, Ultramid® 1C, from BASF SE, produced from the following monomers: caprolactam, hexamethylenediamine, adipic acid, and bis(4-aminocyclohexyl)methane.

Chemical Blowing Agent:

The chemical blowing agent used was:

T-i: a commercially available chemical blowing agent, Hydrocerol® ITP828, from Clariant Group, comprising a mixture composed of sodium hydrogencarbonate and citric acid.

Examples 1-2

A main body was injection-molded from thermoplastic A) in a commercially available injection molding machine with attached injection mold with dimensions 150 mm×70 mm×3 mm. Directly after the solidification of the main body, a second layer (external layer) with the abovementioned dimensions, composed of a mixture of 97 parts by weight of thermoplastic B) and 3 parts by weight of chemical blowing agent, was injected on to the material in the same injection mold, after opening of an additional cavity, in such a way that the two layers overlapped to some extent. The composite component obtained after the cooling process with non-foamed second layer was then stored in an oven for 30 min, in order to bring about the foaming of the second layer. Cooling gave composite components composed of main body and of foamed second layer.

Table 1 gives the nature of the substances used and the essential parameters of the individual process steps.

TABLE 1

| | Example 1 | Example 2 |
|---|---|---|
| Thermoplastic A) | A-i | A-i |
| Thermoplastic B) | B-i | B-i |
| Chemical blowing agent | T-i | T-i |
| Injection molding temperature for A) [° C.] | 280 | 280 |
| Injection molding temperature for the mixture composed of B) and of chemical blowing agent [° C.] | 190 | 190 |
| Temperature of injection mold [° C.] | 80 | 40 |
| Flow rate of mixture composed of B) and of chemical blowing agent [mm/s] | 50 | 70 |
| Hold pressure during injection molding of mixture composed of B) and of chemical blowing agent [bar] | 500 | 600 |
| Foaming temperature [° C.] | 180 | 180 |
| (Thickness of foamed external layer/thickness of non-foamed external layer) | >2 | >2 |
| Adhesion of foamed external layer on main body | good | good |

The examples confirm the reduced cycle times and/or reduced injection molding pressures and/or better capability for computer-aided modeling of the processes of the invention, and also the improved combination of adhesion of the expandable or expanded external layer on the main body, storage stability and/or resistance to moisture, both in the expandable state and in the expanded state, and also recyclability of the composite components of the invention.

The invention claimed is:

1. A process for the production of a composite component via multicomponent injection molding, where the composite component comprises a main body composed of a thermoplastic A) and an external layer composed of a foamed thermoplastic B), said process comprising providing the main body in a first process step a) via injection molding of the thermoplastic A) and subsequent hardening of the thermoplastic A) in an injection mold, and injecting an external layer on to the main body in a second process step b) which follows directly, via injection molding of a mixture comprising the thermoplastic B) and a chemical blowing agent at an injection molding temperature in the range from 180° C. to 200° C., and subsequently hardening the mixture in the same injection mold, with an extended cavity, and foaming the external layer on to the main body in a further process step d) via introduction of heat at a foaming temperature in the range from 180° C. to 200° C., and solidifying the composite component via cooling in a final process step e), wherein the thermoplastic B) comprises at least one polyamide whose modulus of elasticity derived from the tensile test (tensile modulus) $E_t$ is from 1 MPa to 250 MPa, as determined by DIN EN ISO 527 of April 1996, in the entire temperature range from 70° C. to 180° C., and wherein the chemical blowing agent comprises one or more substances present in non-polymerized form, and wherein the thermoplastic B) is a polyamide copolymer which comprises, as monomer units, caprolactam, hexamethylenediamine, adipic acid, and bis(4-aminocyclohexyl)methane.

2. The process according to claim 1, further comprising, after the second process step b) and prior to the further process step d), removing the main body with the external layer injected on to the same from the injection mold, and, in a process step c), introducing the main body into a load-bearing element which is hollow, of shell type, or is of hollow-profile design, wherein the composite component obtained after the final process step e) acts as a reinforcement element for the load-bearing element.

3. The process according to claim 2, wherein the load-bearing element is a hollow profile manufactured from metal.

4. The process according to claim 1, wherein the main body comprises a fiber-reinforced plastic.

5. The process according to claim 1, wherein the chemical blowing agent comprises one or more substances selected from the group consisting of 1,1'-azobis(formamide), sulfohydrazides, dinitrosopentamethylenetetramine, phenyltetrazole, sodium carbonate, and sodium hydrogencarbonate.

* * * * *